No. 694,487. Patented Mar. 4, 1902.
G. W. LOTTRIDGE.
AUTOMATIC WEIGHING MACHINE.
(Application filed Jan. 30, 1901.)

(No Model.) 3 Sheets—Sheet 1.

Witnesses:
G. S. Noble
T. D. McMahon.

Inventor,
George W. Lottridge,
By Charles Turner Brown,
Att'y.

No. 694,487. Patented Mar. 4, 1902.
G. W. LOTTRIDGE.
AUTOMATIC WEIGHING MACHINE.
(Application filed Jan. 30, 1901.)

(No Model.) 3 Sheets—Sheet 2.

Witnesses:
G. S. Noble
J. O. McMahon.

Inventor,
George W. Lottridge,
By Charles Turner Brown
Att'y.

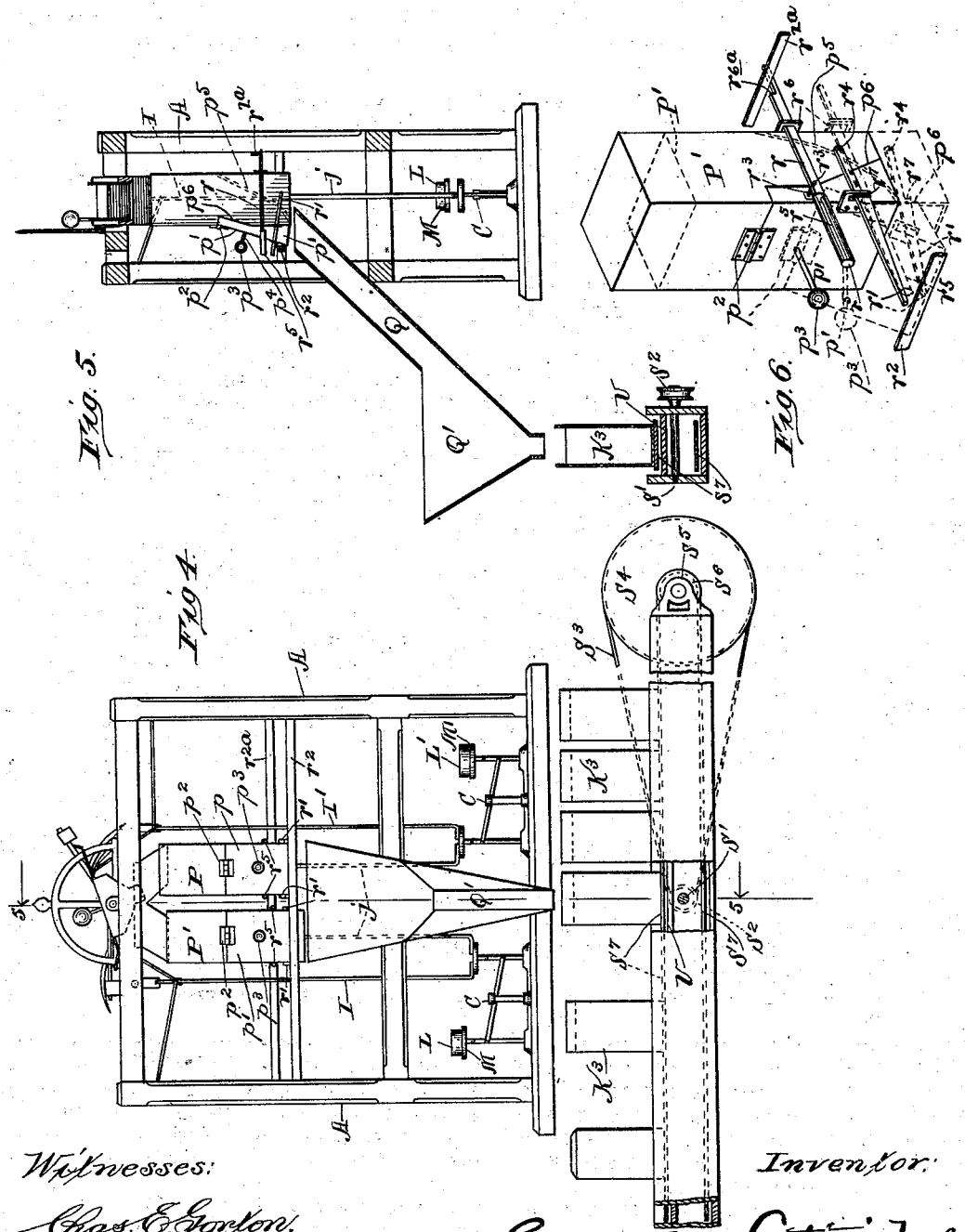

UNITED STATES PATENT OFFICE.

GEORGE W. LOTTRIDGE, OF BRADLEY, ILLINOIS, ASSIGNOR TO FRANK R. SLEEPER AND EUGENE H. MACOY, OF CHICAGO, ILLINOIS.

AUTOMATIC WEIGHING-MACHINE.

SPECIFICATION forming part of Letters Patent No. 694,487, dated March 4, 1902.

Application filed January 30, 1901. Serial No. 45,332. (No model.)

*To all whom it may concern:*

Be it known that I, GEORGE W. LOTTRIDGE, a citizen of the United States, residing at Bradley, county of Kankakee, and State of Illinois, have invented certain new and useful Improvements in Automatic Weighing-Machines for Lumpy, Granulated, and other Material, of which the following, when taken in connection with the drawings accompanying and forming a part hereof, is a full and complete description sufficient to enable those skilled in the art to which it pertains to understand, make, and use the same.

This invention relates to machines for automatically separating a desired weight of material from a mass thereof and automatically delivering the same into a package or other receptacle; and the purpose of this invention is to obtain an automatic weighing-machine by means of which a determined weight of lumpy or granulated material—as, say, starch—as well as a determined weight of powdered material—as, say, table-starch—may be automatically delivered into packages placed to receive the same.

A further purpose of this invention is to obtain an automatic weighing-machine wherein the flow of the material delivered therefrom is continuous and whereby the direction of such flow is automatically determined in a manner to obviate any tendency to break the material when the same is lumpy or granulated.

A further purpose is to obtain a machine of the kind named wherein the flow of material therefrom into the packages being filled thereby will not injure the package or tend to waste such material either by too sudden or too long continued delivery thereof from the machine into such packages.

A further object of this invention is to obtain an automatic weighing-machine of the kind named which will be positive in its action and require no power or machinery in the operation of the movable parts thereof extraneous to the weights used for determining the quantity of the material automatically placed into packages which are being filled thereby.

Figure 1:
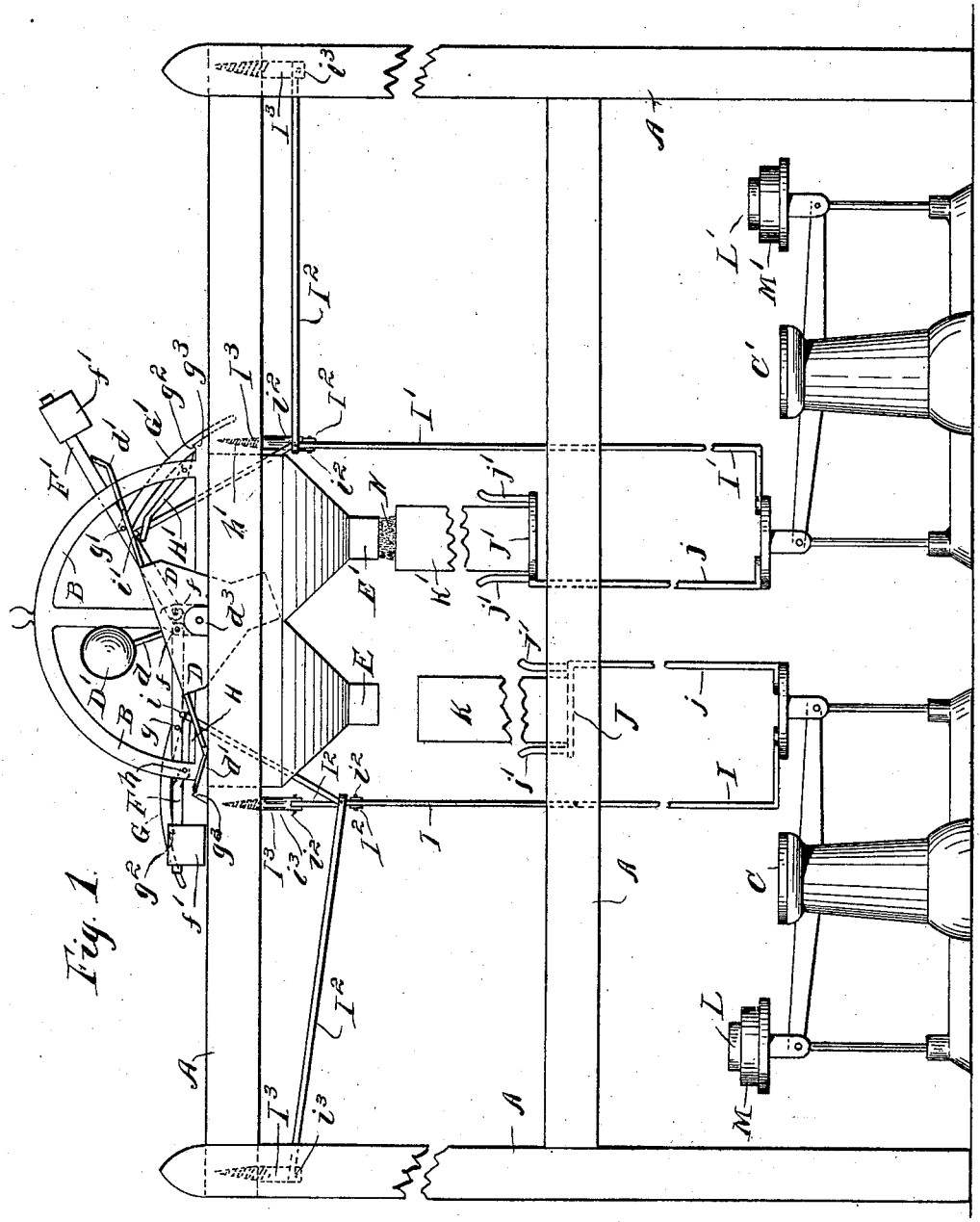
Figure 2:
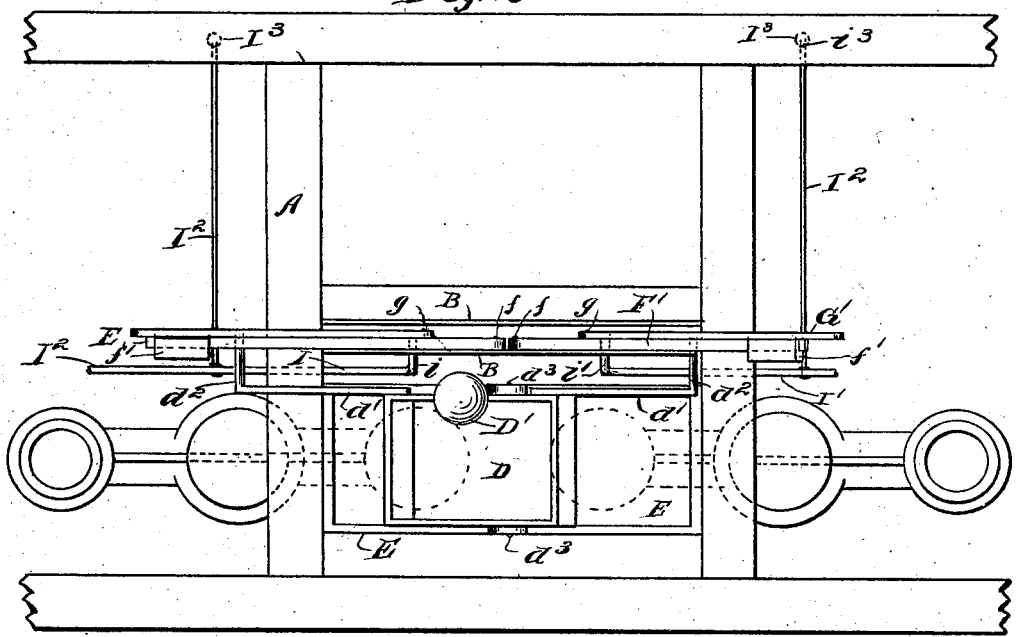
Figure 3:
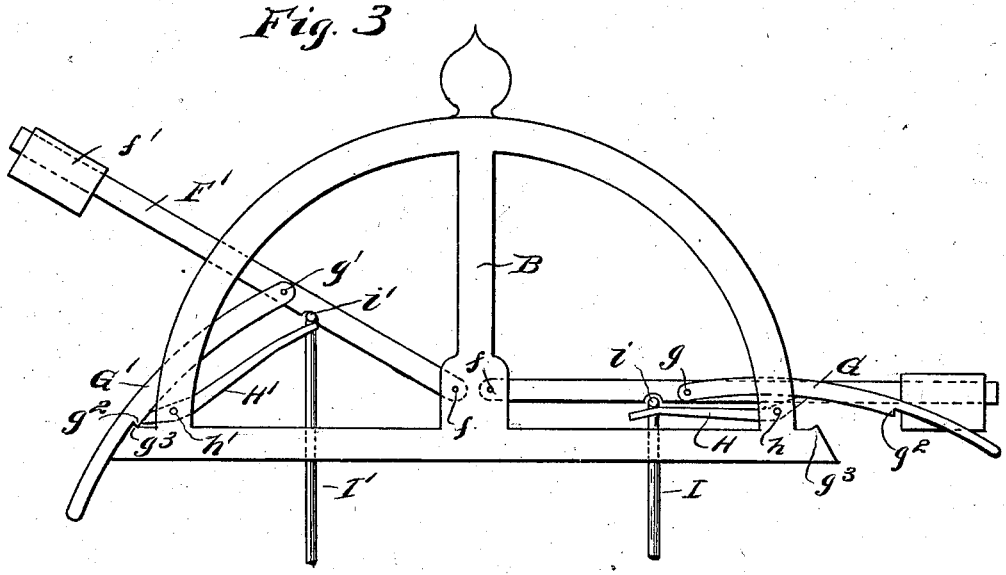

In the drawing referred to as forming a part of this specification, and in which a reference-letter applied to designate a given part is used to indicate such part throughout the several figures wherever the same appears, Figure 1 is a front elevation of a machine embodying this invention. Fig. 2 is a top plan view of the movable parts of such machine and of a portion of the frame thereof; and Fig. 3 is a rear elevation of the weighted levers forming elements in the machine, the mechanisms whereby the levers are maintained in an elevated position, and mechanisms by which the same are tripped and again restored to their initial position. Fig. 4 is a front elevation of a machine embodying the inventions in the constructions shown in Figs. 1, 2, and 3 and additional inventions, hereinafter described. Fig. 5 is a vertical sectional view on line 5 5 of Fig. 4, viewed in the directed indicated by the arrows, and Fig. 6, a perspective view, on an enlarged scale, of a load-receiver, the cover and the latches thereof shown in Figs. 4 and 5, such cover closed and latched, and showing in broken lines such cover open and latched.

The construction illustrated in Figs. 1, 2, and 3 is sufficient and well adapted to automatically weigh and deposit in packages lumpy material—as, say, laundry-starch, unground coffee, and the like—and the construction illustrated in Figs. 4, 5, and 6 embody additional inventions, adapting the machine for use in packing powdered material, as say table-starch, flour, powdered sugar and the like.

The weighing-scales and several parts on the left-hand side of Fig. 1 are shown with the weighing-platform of the scales of the apparatus depressed, as by the packages and contents thereof on the addition-platforms secured to such scales, and with a weighted lever forming an element in the apparatus, a latch designed to maintain such weighted lever in an operative position, and the tripping device thereof depressed to correspond with the depressed platform of the scales, and with the movable hopper of the apparatus shifted by the action of such weighted lever to deliver material therefrom to the right-hand depending spout thereunder, such figure showing the weighing-scales and the several parts on the right-hand side thereof in an elevated position, with material flowing from the hopper into a package on the elevated weighing-platform of the right-hand scales, the lever on such right-hand side maintained in its raised position by an arm or latch connected thereto, and the tripping device of such last-named arm or latch retracted, such parts on the right-hand side of such figure being in position whereby upon the depression of the platform of such right-hand scales the tripping device will disengage the latch, holding the operating-lever raised, permitting the same to fall, and thereby shift the movable hopper into position to deliver material therefrom into the left-hand depending spout thereunder.

A is the frame of the apparatus, and B is the frame of the several levers and arms of the machine, which levers and arms are controlled by the position of the platform of the scales C C', respectively, and which levers and arms in turn control the position of the movable hopper of the machine.

D' is a weight attached to movable hopper D by rod $d$, such weight tending to maintain the hopper in a given position until the same is changed by one or the other of the operating-levers F F', hereinafter described, and $d'$ $d'$ are arms extending out from the movable hopper D and bent at the extremities $d^2$ $d^2$ thereof into the path of movement of such operating-levers.

$d^3$ $d^3$ are the pivots on which movable hopper D is mounted.

E E' are the depending spouts of the stationary hopper underneath the movable hopper D, into which depending spouts material is alternately delivered from such movable hopper D.

F F' are weighted levers pivotally attached, as at $f$, to frame B, such levers when released from a raised position constituting the motive power actuating the movable hopper D, as is hereinafter described. Levers F F' also accelerate the downward movement of the weighing-platforms of the scales C C', respectively, when the packages or other receptacles thereon contain a determined weight of material. Levers F F' are therefore hereinafter termed "operating-levers."

$f'$ $f'$ are the weights on operating-levers F F'.

G G' are latches pivotally attached, as at $g$ $g'$, to operating-levers F F', respectively.

$g^2$ $g^2$ are shoulders on latches G G', engaging with abutments $g^3$ $g^3$ in frame B, respectively.

H H' are tripping-levers pivotally mounted, as at $h$ $h'$, respectively, to frame B.

I I' are rods secured at the lower end thereof, respectively, to the platform of the respective scales C C' and bent at the upper ends thereof, as at $i$ $i'$, into the path of movement of the operating-levers F F' and latches G G', respectively, thereby engaging both parts.

$I^2$ $I^2$ are arms pivotally secured at one end thereof, as by pivots $i^2$ $i^2$, to the connections I I', respectively, and at the other end thereof, as by pivot $i^3$, to abutments $I^3$ to guide the movement of the upper end of such connections I I'.

J J' are platforms forming carton-holders, which are respectively rigidly secured to the weighing-platforms of the scales C C', as by standards $j$ $j$, and $j'$ $j'$ are guards or fingers which I prefer to place on platforms J J', respectively, between which guards packages K K' are slidden or pushed onto or off of platforms J J'.

The platforms J J' are not essential elements in this apparatus, such platforms performing the same functions as do the weighing-platforms of scales and such platforms J J' being used and attached, as described, merely to obviate the necessity of raising the scales C C', respectively, so that the platforms thereof will be in substantially the same place as are the platforms J J'. The position of the platforms J J' relative to the hoppers E E' is determined by the size of the packages K K', the upper edges of such packages when open being desired to be adjacent to the hopper thereover (when the platforms of the scales are raised and the packages are being filled) to obviate waste of the material which passes from the hopper to the packages.

Referring to the construction illustrated in Figs. 4, 5, and 6 of the drawings, P P' are receptacles mounted on the weighing-platforms of the scales C C', as by standards $j$ $j$, respectively, in Figs. 4 and 5. $p$ $p'$ are movable covers to openings provided at the lower end of the receptacles P P', respectively, such covers being preferably hinged, as at $p^2$, to the front of the receptacles P P', respectively. $p^3$ $p^3$ are weights attached to the covers $p$ $p'$, as by rod $p^4$, (see Fig. 5,) so that such covers $p$ $p'$ are yieldingly held closed thereby. The covers are forced open when unlatched by the contents of the respective receptacles P P', and to insure delivery of all of the contents of the receptacles P P' into the down-spout Q the bottom of such receptacles are inclined substantially as shown by broken lines $p^5 p^5$ in Fig. 5. The edges of covers $p$ $p'$ are turned over on the sides of the receptacles P P', respectively, as at $p^6$ $p^6$. To maintain the covers $p$ $p'$, respectively, closed while the receptacles P P' are being filled and open while such receptacles are being emptied, respectively, I provide a fastening comprising latches $r$ $r'$ and the abutments $r^2 r^{2a}$, against which abutments, respectively, latches $r$ $r'$ are respectively forced when the receptacles P P' descend after such receptacles are filled and when they ascend after being emptied, thereby unlatching or loosening the covers $p$ $p'$, respectively, and latching them open in their descent and latching the covers in a closed position as the receptacles ascend after being emptied. Latches $r$ $r$, respectively, are pivoted, as at $r^3$, to respective covers $p$ $p'$, and latches $r'$ $r'$, respectively, are pivoted, as at $r^4$, to the respective receptacles P P'. Latch $r$ is weighted, as at $r^5$, to yieldingly hold the free end thereof against the abutment $r^2$ when the receptacles P P', respectively, are in a raised position and against abutment $r^6$ on such receptacles, respectively, as they descend. $r^{6a}$ is a notch on lever $r$, which engages with abutment $r^6$ on the receptacles, respectively, when the receptacles respectively descend and the respective covers $p$ $p'$ thereof are opened. If such covers, therefore, are open on the descent of such receptacles, respectively, they will be held open by latch $r$ until the receptacles have respectively ascended into substantially their raised position, after which time levers $r$ $r$ on the respective receptacles P P' become engaged with abutments $r^{2a}$ $r^{2a}$ and are disengaged from abutments $r^6 r^6$, thereby permitting weights $p^3 p^3$, respectively, to yieldingly close covers $p$ $p'$. When the receptacles P P', respectively, are in a raised position and covers $p$ $p'$ thereof are closed, the respective levers $r'$ $r'$ engage with the abutments $p^7 p^7$ on such covers, respectively, (as by notches $r^7 r^7$,) thereby latching the covers in a closed position until such time as (by the descent of the receptacles P P', respectively) latches $r'$ $r'$ are brought against abutments $r^2$ $r^2$, respectively, and thereby released from engagement with abutments $p^7 p^7$, at which time the material contained in the receptacles will force the covers open, (as against weights $p^3 p^3$,) and such covers will be latched in such open position by notches $r^{6a}$ $r^{6a}$ on latches $r$ $r$, respectively, engaging with the respective abutments $r^6 r^6$, as are hereinabove described. Abutment $r^2$ is positioned relative to latch $r'$ so that the receptacles will partially descend, respectively, before such latch and abutment engage, so as to give time for movable hopper D to move from position discharging into one of the depending spouts E E' into position to discharge into the other of such depending spouts before the covers $p$ $p'$, respectively, are unlatched. $r^7$ (see Fig. 6) is a projection on the covers $p$ $p'$, respectively, with which the latches $r'$ $r'$ engage to hold such covers shut and arranged so that the covers are loosened when the latch is in the position thereof illustrated in Fig. 5 of the drawings, (receptacle P' being depressed by the weight of the contents thereof.) Q is a spout underneath the receptacles P P', into which spout the contents of such receptacles are successively discharged. Spout Q is enlarged at the lower end Q' thereof to contain the entire contents of the packages P P', respectively, as at Q'. $S^2$ is a driving-pulley of the shaft S', rigidly secured to such shaft. $S^3$ is the driving-belt of the pulley $S^2$ and shaft S', such driving-belt extending over pulley $S^2$ and over the driving-pulley $S^4$ on shaft $S^5$. $S^6$, Fig. 4, is a wheel or drum rigidly secured to shaft $S^5$ to turn therewith, and $S^7$ is a belt forming a movable platform on which the packages $K^3$ $K^3$ are placed to be filled from the spout Q. As the several packages $K^3$ $K^3$ are moved across the lower end of part Q' of spout Q, the contents of one or the other of the receptacles P P' are discharged from such receptacles, passing through the spout Q thereunder and with such rapidity as to obviate any stoppage of the movable belt $S^7$, the forward motion of such belt or platform being, relative to the discharge of the contents of the receptacles P P', so determined that an unfilled one of the packages $K^3$ $K^3$ is moved forward in suitable position to receive the contents of one or the other of the receptacles P P' as the same are discharged.

The operation of the construction illustrated in Figs. 1, 2, and 3 of the drawing is: When sufficient material N has flowed into the package K' to more than counterbalance weight M', platform J', together with the platform of the scale C', will commence to descend, and thereupon trip H' will be actuated by end $i'$ of connection I', and shoulder $g^2$ of latch G' will thereby be disengaged from abutment $g^3$, permitting the lever F' to fall from the position thereof illustrated on the right-hand side of Fig. 1 and the left-hand side of Fig. 3 into substantially the position of weighted lever F, (on the left-hand side of Fig. 1 and right-hand side of Fig. 3.) The down movement of lever F' will be comparatively rapid, and thereby the movable hopper D will be rapidly rocked on pivot $d^3$ by bent extremity $d^2$ of arm $d$, adjacent to and underneath such weighted lever, being carried downward thereby. The uninterrupted flow of material from hopper D is thus diverted into spout E. While package K' is being filled, as last above described, package K is taken from off the platform J, and weight M will thereupon force platform J and connection I upward into about the position of platform J' and its connection I', (on right-hand side of Fig. 1 and left-hand side of Fig. 3.) The weighted lever F is raised by the raising of connection I, as last above described, to a sufficient height, so that the shoulder $g^2$ of latch G engages with the abutment $g^3$, and the weighted lever F is thereby sustained in its raised position by such latch G. The weight of such weighted lever F is thereby taken from the connection, so that such connection I will not be depressed to any considerable extent (and not sufficient to actuate the tripping-arm H) until sufficient material has flowed from spout E into package K to counterbalance and a little more the weight M, when the package K, platform J, and connection I will be depressed in the same manner as herebefore described with reference to the package K', platform J' and connection $i'$. The tripping-lever H will be actuated by the downward movement of the connection I by the end $i$ of the connection and the weighted lever F will fall into substantially the position thereof illustrated in Fig. 1 and 2, thereby rocking or turning movable hopper D into the position thereof illustrated in Figs. 1 and 2. Package K' having been removed from platform J' while package K was being filled, as last above described, and an additional empty package having been placed on such platform J', the lever F', with its several connecting parts, will have been raised into the position thereof illustrated in the drawings, and such additional packages will be filled in the manner hereinbefore described relative to package K'. The operation, as described, will be continued so long as the filled packages are taken from the depressed platforms J J', respectively, and replaced by empty packages, and material is supplied to movable hopper D.

In the construction illustrated in Figs. 4, 5, and 6 the operation of the parts corresponding with the construction illustrated in Figs. 1, 2, and 3 is the same as last above described, and the operation of the additional parts therein contained is as follows: When a determined weight of material is deposited in the receptacles P P', such receptacles will descend successively in precisely the same manner as do the packages K K', and in the descent of the receptacles the latches $r'$ $r'$ are brought into contact with abutments $r^2$ $r^2$, and thereby raised from contact with projection $p^7$, so releasing covers $p$ $p'$, respectively, and permitting the powdered material in the receptacles to flow into spout Q. Such material passes freely through the spout to the packages $K^3$ $K^3$, an empty one of such packages being brought to the mouth of such spout as a filled one is moved away therefrom.

Having thus described my invention, the construction of a machine embodying the same, and the operation of such machine, what I claim as new, and desire to secure by Letters Patent, is—

1. In an automatic weighing-machine, the combination of a stationary hopper provided with a plurality of depending spouts, load-receivers to such depending spouts, respectively, a movable hopper above the stationary hopper to discharge successively into the depending spouts, means to yieldingly maintain the movable hopper in position to discharge into a given depending spout, levers and means to yieldingly maintain such levers in a depressed position, respectively, means to raise the levers respectively, means to maintain the levers in a raised position, respectively, means to successively trip such maintaining mechanisms when a determined weight of material has been discharged from the movable hopper into one of the load-receivers, and a connection between the movable hopper and the levers, whereby the return of a lever to its depressed position moves the movable hopper from one of the positions thereof into the other of its positions: substantially as described.

2. In an automatic weighing-machine, the combination of a stationary hopper provided with a plurality of depending spouts, a pivotally-mounted hopper above the stationary hopper movable to successively discharge into the depending spouts, load-receivers to such depending spouts, respectively, a weight mounted on the movable hopper above the pivots thereof to move through the vertical plane in which the pivots are placed as the hopper moves from its position discharging into one depending spout to its position to discharge into the other depending spout, whereby the movable hopper is yieldingly maintained by such weight in position to discharge into a given depending spout, weighted levers, means for raising the weighted levers, respectively, and means for maintaining the weighted levers, respectively, in a raised position, means for tripping such maintaining mechanisms when a determined quantity of material has been discharged from the movable hopper into the load-receiver adjacent to the tripping mechanism, and a connection between the movable hopper and the weighted levers, whereby the falling of a weighted lever moves such movable hopper from one of the positions thereof into the other of its positions: substantially as described.

3. In an automatic weighing-machine, the combination of a stationary hopper provided with a plurality of depending spouts, a pivotally-mounted hopper thereover movable to successively discharge into the depending spouts, means for yieldingly maintaining the movable hopper in position to discharge into a given depending spout, receptacle-supports yieldingly mounted to move when a given weight of material is received thereon from the depending spouts and to return to the initial position thereof when the given weight of material is removed therefrom, mechanisms moved to operative position respectively, by the return of the receptacle-supports to the initial position thereof, respectively, connections between such mechanisms and the pivotally-movable hopper, means for maintaining such mechanisms in an operative position, respectively, independently of the receptacle-supports, and connections between the mechanisms and the yieldingly-mounted receptacle-supports whereby such mechanisms are released from the operative position thereof when the receptacle-supports are moved by a given weight of material thereon and the movable hopper is moved to discharge into the other depending spout by the operation of such released mechanism; substantially as described.

4. In an automatic weighing-machine, the combination of scales provided with load-receivers, a stationary hopper provided with a plurality of depending spouts, a movable hopper above the stationary hopper adapted to successively discharge into the depending spouts, means to yieldingly maintain the movable hopper in position to discharge into a given spout, operating-levers, abutments, latches to engage with such abutments to maintain the operating-levers in an operative position, respectively, levers adapted to trip the latches, respectively, connections between the scales and the tripping and operating levers whereby the tripping-levers are, respectively, moved to unlatch the latches corresponding therewith when the load-receivers of the scales are moved by a determined weight of material thereon, respectively, and to move such operating-levers into an operative position by the movement of the scales when such determined weight of material is removed therefrom, and a connection between the movable hopper and the operating-lever, whereby when the movable hopper is in position to discharge into one of the depending spouts and one of such operating-levers is released from its operative position the movable hopper is moved thereby in position to discharge into the other depending spout: substantially as described.

5. In an automatic weighing-machine, the combination of a stationary hopper provided with a plurality of depending spouts, a movable hopper above the stationary hopper to successively discharge into the depending spouts, means to yieldingly maintain the movable hopper in position to discharge into a given depending spout, levers and means to maintain the respective levers in a depressed position, movable platforms and means to yieldingly maintain such platforms in a raised position, and to determine the weight of material to depress such platforms, respectively, latches to maintain the levers in a raised position, respectively, connections between the respective movable platforms and the levers and latches corresponding thereto to elevate such levers by the elevation and to trip such latches by the depression of the movable platforms, and connections between the respective levers and the movable hopper, whereby the depression of a lever moves such movable hopper from one of its positions into the other of its positions.

6. In an automatic weighing-machine, the combination of a stationary hopper provided with a plurality of depending spouts, movable load-receivers to such depending spouts, respectively, covers to the respective load-receivers, latches to such covers, respectively, abutments coacting with the latches, a movable hopper above the stationary hopper, to discharge successively into the depending spouts, means to yieldingly maintain the movable hopper in position to discharge into a given depending spout, levers and means to yieldingly maintain such levers in a depressed position, respectively, means to raise the levers, respectively, means to maintain the levers in a raised position, respectively, means to successively trip such maintaining mechanisms when a determined weight of material has been discharged from the movable hopper into the load-receivers, and a connection between the movable hopper and the levers, whereby the return of a lever to its depressed position moves the movable hopper from one of the positions thereof into the other of its positions: substantially as described.

7. In an automatic weighing-machine, the combination of a stationary hopper provided with a plurality of depending spouts, movable load-receivers to such depending spouts, respectively, covers to the respective load-receivers, latches to such covers, respectively, abutments coacting with some of such latches to move the latches from engagement holding the covers closed, and abutments coacting with the remainder of such latches to move them from engagement holding the covers open, a movable hopper above the stationary hopper to discharge successively into the depending spouts, means to yieldingly maintain the movable hopper in position to discharge into a given depending spout, levers and means to yieldingly maintain such levers in a depressed position, respectively, means to raise the levers, respectively, means to maintain the levers in a raised position, respectively, means to successively trip such maintaining mechanisms when a determined weight of material has been discharged from the movable hopper into the load-receivers, successively, and a connection between the movable hopper and the levers, whereby the return of the lever to its depressed position moves the movable hopper from one of the positions thereof into the other of its positions: substantially as described.

GEORGE W. LOTTRIDGE.

In presence of—
ANNA M. KAMMANN,
C. B. RUSSELL.